(12) United States Patent
Kuebler et al.

(10) Patent No.: US 8,667,915 B2
(45) Date of Patent: Mar. 11, 2014

(54) TONGUE MOUNTED FERTILIZER TANK FOR FERTILIZER APPLICATOR

(75) Inventors: Marvin Kuebler, Goodfield, IL (US); Jarod Murdock, Knoxville, IL (US)

(73) Assignee: CNH America LLC, New Holland, PA (US)

( * ) Notice: Subject to any disclaimer, the term of this patent is extended or adjusted under 35 U.S.C. 154(b) by 185 days.

(21) Appl. No.: 13/237,246

(22) Filed: Sep. 20, 2011

(65) Prior Publication Data

US 2013/0025515 A1 Jan. 31, 2013

Related U.S. Application Data

(60) Provisional application No. 61/512,314, filed on Jul. 27, 2011.

(51) Int. Cl.
*A01C 23/00* (2006.01)

(52) U.S. Cl.
USPC .......................... 111/118; 280/830; 222/610

(58) Field of Classification Search
USPC .......... 111/110, 118–129; 239/172, 175, 722, 239/77; 222/610; 280/830, 833
See application file for complete search history.

(56) References Cited

U.S. PATENT DOCUMENTS

| | | | |
|---|---|---|---|
| 1,204,772 A | 11/1916 | Hornecker | |
| 2,008,891 A | 7/1935 | Woods | |
| 2,559,183 A | 7/1951 | Barnett | |
| 2,799,234 A | 7/1957 | Chancey | |
| 2,804,034 A | 8/1957 | Hunter | |
| 3,003,775 A | 10/1961 | Ackley | |
| 3,526,342 A * | 9/1970 | Pechacek | 222/610 |
| 3,583,718 A * | 6/1971 | Meyer | 280/830 |
| RE27,295 E | 2/1972 | Pechacek | |
| 4,141,302 A * | 2/1979 | Morrison et al. | 111/52 |
| 4,186,671 A | 2/1980 | Huang | |
| 4,244,522 A * | 1/1981 | Hartwig | 239/148 |
| 4,434,991 A | 3/1984 | Winterton | |
| 4,569,296 A * | 2/1986 | Miller et al. | 111/123 |
| 4,677,787 A * | 7/1987 | Said | 47/1.5 |
| 5,159,887 A * | 11/1992 | Poll | 111/109 |
| 5,267,517 A | 12/1993 | Jones | |
| 5,996,704 A | 12/1999 | Landry | |
| 6,997,121 B2 | 2/2006 | Buchholtz | |
| D523,447 S | 6/2006 | Dixon | |
| 7,694,638 B1 | 4/2010 | Riewerts et al. | |
| 7,703,404 B2 | 4/2010 | Horn et al. | |
| D627,373 S | 11/2010 | Prickel et al. | |
| D629,426 S | 12/2010 | Prickel et al. | |
| D629,427 S | 12/2010 | Prickel et al. | |
| D631,068 S | 1/2011 | Prickel et al. | |
| 7,980,318 B1 * | 7/2011 | Waldo | 172/707 |

FOREIGN PATENT DOCUMENTS

JP 03061133 3/1991

* cited by examiner

*Primary Examiner* — Alicia Torres
(74) *Attorney, Agent, or Firm* — Rebecca L. Henkel

(57) ABSTRACT

A fertilizer stabilizer tank and tank mounting system for mounting the tank to the tongue or hitch frame of a fertilizer applicator is provided. The mounting system mounts the stabilizer tank in a manner that does not interfere with operation of the tractor or reconfiguration of the applicator as the applicator is folded/unfolded.

9 Claims, 3 Drawing Sheets

TONGUE MOUNTED FERTILIZER TANK FOR FERTILIZER APPLICATOR

CROSS-REFERENCE TO RELATED APPLICATION

The present application claims the benefit of U.S. Ser. No. 61/512,314 filed Jul. 27, 2011.

BACKGROUND OF THE INVENTION

The present invention relates generally to farm implements and, more particularly, to an apparatus for mounting a liquid fertilizer tank to the tongue or hitch frame of a fertilizer applicator.

Pre-plant fertilizer implements, such as the Case New Holland Nutri-Placer 940, are designed to apply fertilizer and specifically anhydrous ammonia during seed bed preparation. The fertilizer implement generally consists of a tool bar or main frame that can be hitched to a tractor other towing vehicle. Working tools, or combinations of working tools, such as shanks, coulters, knives, banders, and the like, can be mounted to the main frame and are designed to manage crop residue, improve soil tilth, and band plant food in the root zone. As the working tools are pulled through the soil, fertilizer, such as anhydrous ammonia, is routed from a tank hitched to the trailing end of the implement to fertilizer outlets integrally formed or mounted adjacent the working tools.

Farming practices continue to demand larger ("wider") implements to reduce the time needed to cultivate or prepare or plant a seedbed. This is also true of fertilizer applicators or implements. For instance, it is not uncommon for a fertilizer implement to have more than twenty working tools. The aforementioned Nutri-Placer 940, for example, can be fitted to have more than fifty shanks on fifteen inch centers across its sixty-five foot frame. A fertilizer hose is typically routed to each working tool and to ensure fertilizer consistency ("even application") across the width of the implement, each hose is preferably the same length. This can result in several hundred feet of hose being routed from the fertilizer tank, which is typically towed behind the implement, to the working tools. Needless to say, this can create a relatively congested fertilizer applicator. Adding to the congestion is that a fertilizer applicator will typically include manifolds and other items required to move fertilizer from a rearward towed fertilizer tank.

Many farmers prefer to mix the fertilizer stabilizer with the fertilizer, e.g., anhydrous ammonia, before the fertilizer is applied to the seedbed. Stabilizers, such as N-Serve from ConAgra, improve fertilizer attachment to the soil and thus fertilizer retention. Better retention reduces fertilizer consumption and costs without sacrificing plant performance. A common approach is to mix the stabilizer with the fertilizer in the fertilizer tank; however, many stabilizers are highly corrosive and can damage the fertilizer tank over time. Another approach is to mount a liquid stabilizer tank to the implement frame itself; however, the congestion of the hoses, manifolds, valves, pumps, and the like can make that difficult. As many applicators are of the fold-up or front-folding type, the number of available frame-mounted positions is limited. It is also imperative that the stabilizer tank not interfere with operation of the tractor, such as during headland turns.

SUMMARY OF THE INVENTION

The present invention is generally directed to a fertilizer stabilizer tank and tank mounting system for mounting the tank to the tongue or hitch frame of a fertilizer applicator in a manner that does not interfere with operation of the tractor or reconfiguration of the applicator as the applicator is folded/unfolded.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
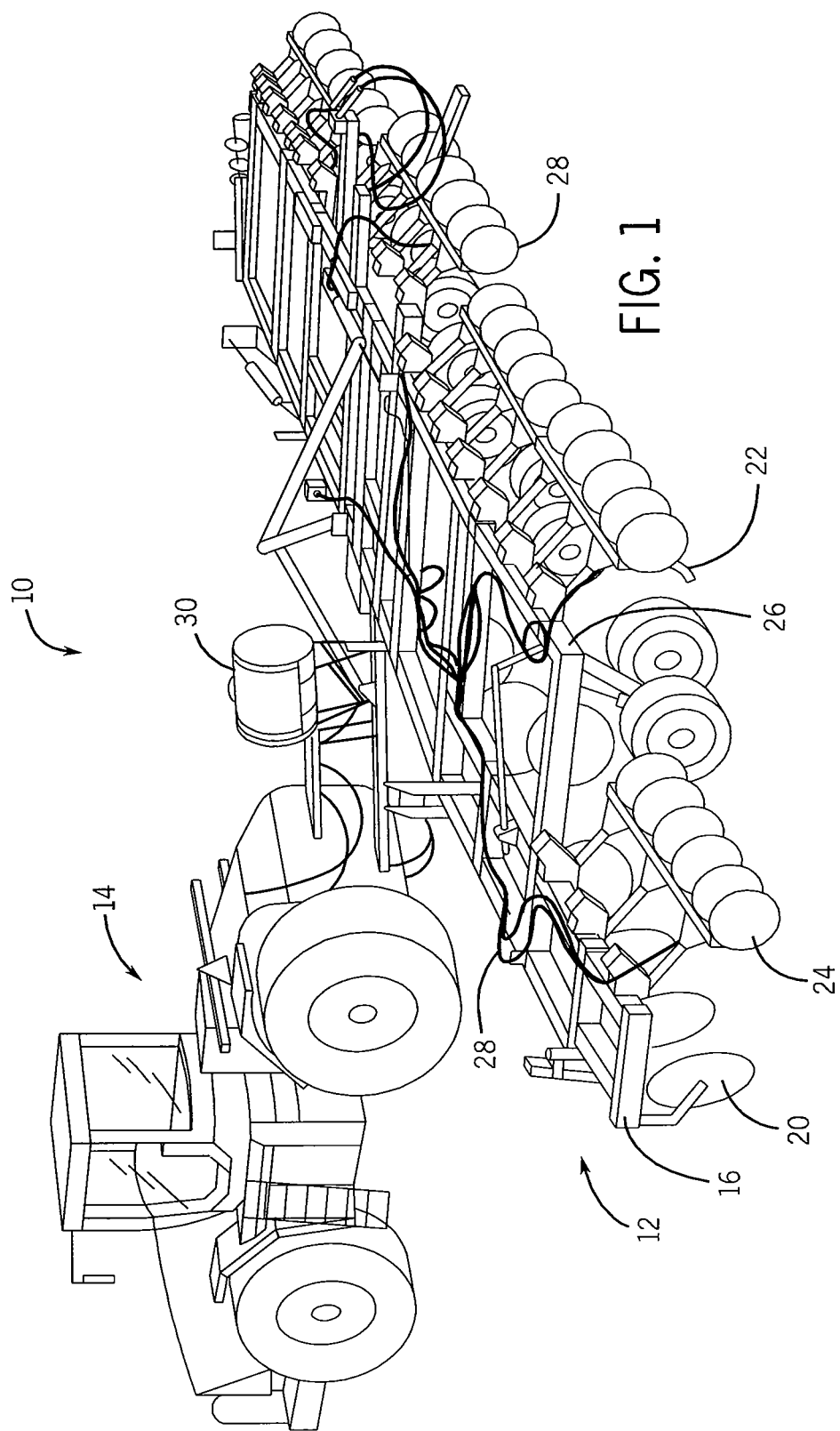
FIG. 1 is an isometric view of a farming system having a fertilizer applicator.

Turning now to FIG. 1, the present invention will be described with respect to a farming system 10 having a fertilizer applicator 12 that is hitched to a tractor 14. It is understood however the present invention could be used with other types of farming or construction implements and that other types of towing vehicles could be used to tow the implement. The fertilizer applicator 12 generally consists of a frame 16 formed by a series of interconnected, i.e., welded, frame members 18, to which one or more types of working tools are mounted. In the illustrated embodiment, the working tools include coulters 20, knives 22, and cultivators 24. As known in the art, the working tools are designed to manage crop residue and prepare the soil bed for an upcoming seeding.

In addition to managing crop residue, preparing the seed bed commonly includes adding plant food and other nutrients to the soil. In this regard, the fertilizer applicator 12 includes a hose arrangement 26 that consists of a number of preferably equal-length hoses 28 extending from a fertilizer source, which is not shown but is typically towed behind the fertilizer applicator 12, to respective ones of the working tools. In the illustrated embodiment, the outlet (not shown) of each hose 28 sits generally adjacent a respective knife 22 so that fertilizer is deposited into the soil as the knives 22 cut through the soil and the crop residue.

Figure 2:
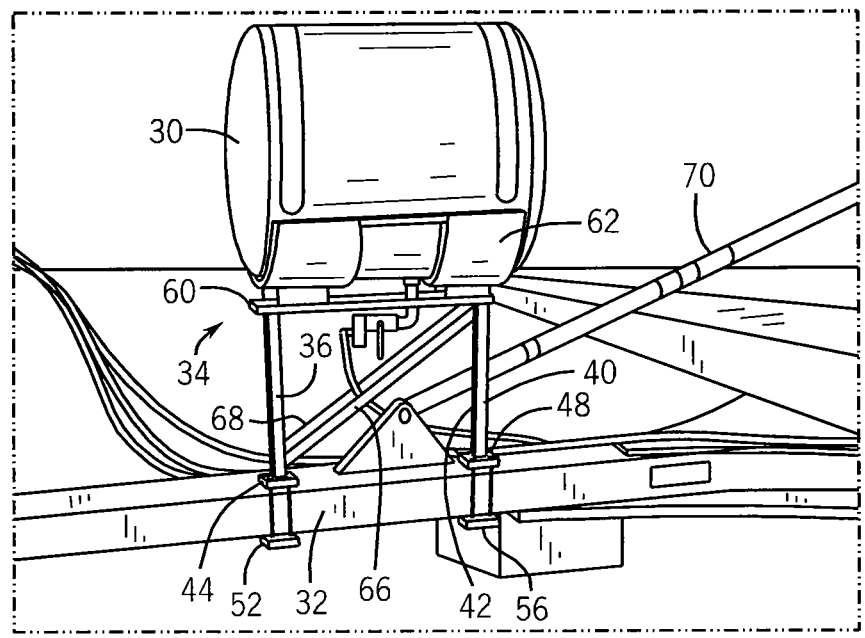
FIGS. 2-4 are views of fertilizer stabilizer tank and tank mounting system according to the present invention.
Figure 3:
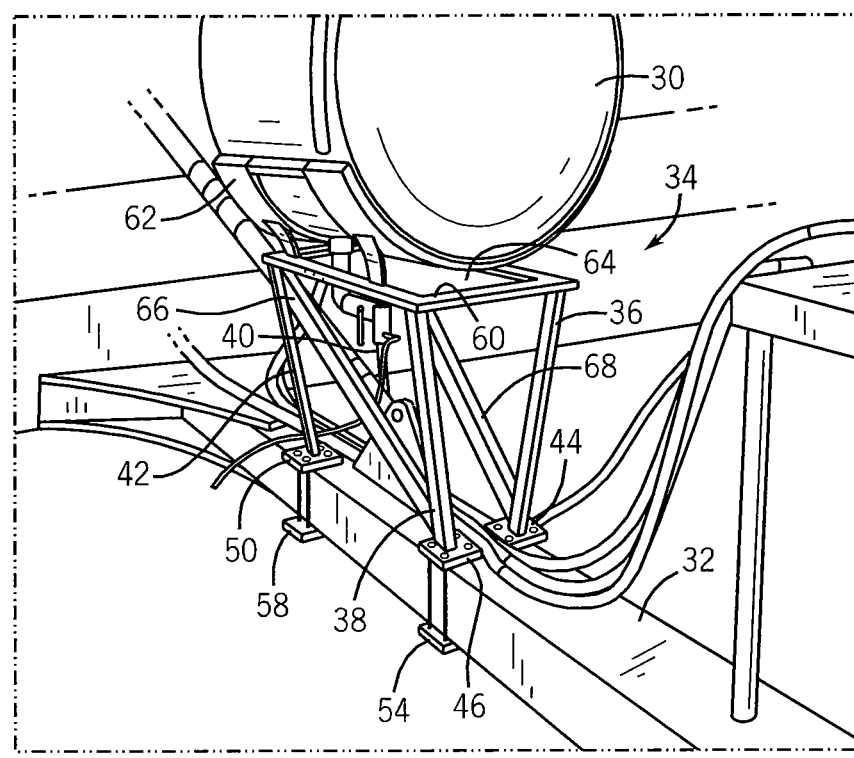
Figure 4:
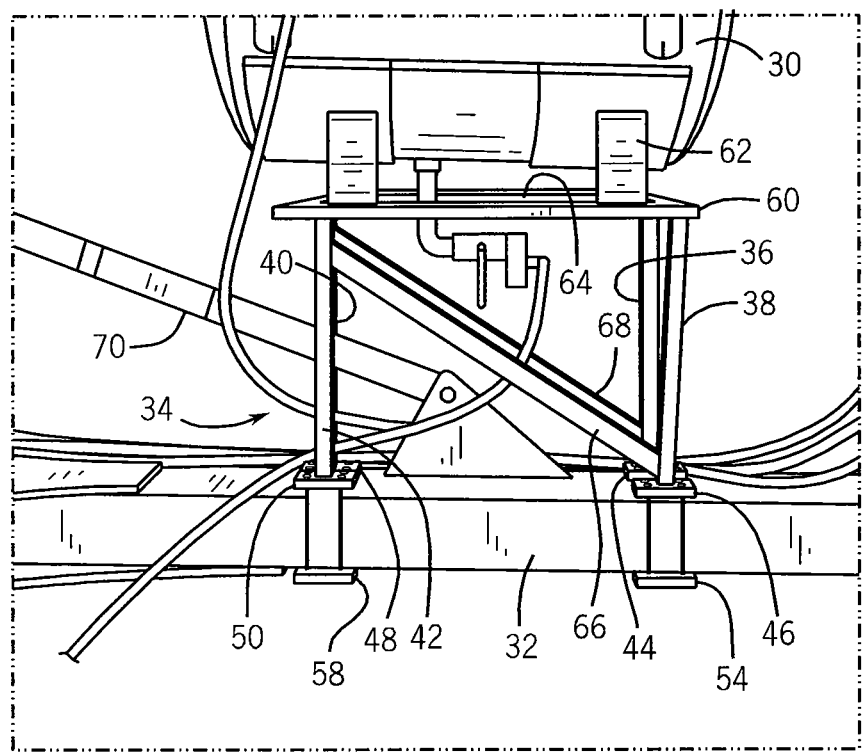

With additional reference to FIGS. 2-4, the fertilizer applicator 12 includes a liquid stabilizer tank 30 that is attached to the hitch frame 32 ("tongue") of the fertilizer applicator 12 by a mount 34. The mount 34 is positioned along the length of the hitch frame 32 so as to not interfere with operation of the tractor 14 or the fertilizer applicator 12 when it is being folded to a transport or stowed position.

The mount 34 generally consists of four legs 36, 38, 40, 42 extending obliquely from respective feet 44, 46, 48, 50, which are secured to the hitch frame 32 using clamps 52, 54, 56, 58 or other fasteners. The legs 36, 38, 40, 42 support a generally planar lower frame 60 that is attached to a convex upper frame 62 extends to form a saddle onto which the tank 30 sits. The lower frame 60 has a central opening 64 to enable pumps and the like associated with operation of the tank 30 to extend below the tank 30 in a conventional manner. In the illustrated embodiment, crossbars 66, 68 extending from the forward feet 44, 48 to the upper portions of the forward legs 36, 38 to provide additional stability for the tank 30. In one embodiment, the tank is a fifty gallon tank. As shown in the figures, the mount 34 is configured so that the tank 30 sits parallel to the direction of travel.

As noted above, the mount 34 is secured to the hitch frame 32 and thus sits between the tractor 14 and the frame 16 to which the working tools are mounted. In the illustrated embodiment, the length of the legs 36, 38, 40, 42 elevates the upper frame 62 and thus the tank 30 to allow clearance for the hydraulic actuator 70 used for leveling the frame 16.

Many changes and modifications could be made to the invention without departing from the spirit thereof. The scope of these changes will become apparent from the appended claims.

The invention claimed is:

1. A mounting system for mounting a tank for holding fertilizer stabilizer to the hitch frame of a farm implement, comprising:
   an upper member for attaching to a base of the tank;
   a first pair and a second pair of legs, the legs each having an upper end, an elongated body, and a lower end;
   a first clamp for attaching the lower end of one of the legs of the first pair and the lower end of one of the legs of the second pair to the hitch frame;
   a second clamp for attaching the lower end of the other one of the legs of the first pair and the lower end of the other one of the legs of the second pair to the hitch frame; and
   a first and second crossbars, wherein the first crossbar extends between one of the legs of the first pair and one of the legs of the second pair and the second crossbar extends between the other one of the legs of the first pair and the other one of the legs of the second pair.

2. The mounting system of claim 1 wherein the upper member is a planar member having a central opening.

3. The mounting system of claim 1 wherein the upper end of each leg is offset outwardly from the lower end of each leg.

4. The mounting system of claim 1 wherein the lower end of each leg is bolted to a respective clamp.

5. The mounting system of claim 1 further comprising first and second crossbars, wherein the first crossbar extends between one of the legs of the first pair and one of the legs of the second pair and the second crossbar extends between the other one of the legs of the first pair and the other one of the legs of the second pair.

6. The mounting system of claim 1 wherein the first and second crossbars are inclined in a fore and aft direction.

7. A farm implement comprising:
   a main frame;
   a ground engaging tool coupled to the main frame;
   a hitch frame for coupling the main frame to a towing vehicle;
   a liquid tank; and
   a stand for mounting the liquid tank to the hitch frame, the stand having an upper member for attaching to the tank and a set of legs extending downward and inwardly from the upper member, and a clamp arrangement for attaching the legs to the hitch frame;
   wherein the set of legs includes as first pair and a second pair of legs, the legs each having an upper end, an elongated body, and a lower end, and wherein the clamp arrangement includes a first clamp for attaching the lower end of one of the legs of the first pair and the lower end of one of the legs of the second pair to the hitch frame, and a second clamp for attaching the lower end of the other one of the legs of the first pair and the lower end of the other one of the legs of the second pair to the hitch frame;
   wherein the stand further comprises first and second crossbars, wherein the first crossbar extends between one of the legs of the first pair and one of the legs of the second pair and the second crossbar extends between the other one of the legs of the first pair and the other one of the legs of the second pair.

8. The farm implement of claim 7 wherein the upper member is a planar member having a central opening.

9. The farm implement of claim 7 wherein the lower end of each leg is bolted to a respective clamp.

* * * * *